(12) United States Patent
Messer et al.

(10) Patent No.: US 8,118,994 B2
(45) Date of Patent: Feb. 21, 2012

(54) COMPOSITIONS, CONFIGURATIONS, AND METHODS OF REDUCING NAPHTENIC ACID CORROSIVITY

(75) Inventors: Barry Messer, Calgary (CA); Bart Tarleton, Calgary (CA); Michael Beaton, Calgary (CA)

(73) Assignee: Fluor Technologies Corporation, Aliso Viejo, CA (US)

( * ) Notice: Subject to any disclaimer, the term of this patent is extended or adjusted under 35 U.S.C. 154(b) by 599 days.

(21) Appl. No.: 10/575,330

(22) PCT Filed: Jul. 1, 2004

(86) PCT No.: PCT/US2004/021468
§ 371 (c)(1),
(2), (4) Date: Feb. 26, 2008

(87) PCT Pub. No.: WO2005/040313
PCT Pub. Date: May 6, 2005

(65) Prior Publication Data
US 2008/0164137 A1    Jul. 10, 2008

Related U.S. Application Data

(60) Provisional application No. 60/512,025, filed on Oct. 17, 2003.

(51) Int. Cl.
*C10G 7/10* (2006.01)
(52) U.S. Cl. .............. 208/47; 208/263; 208/14; 208/15; 208/19
(58) Field of Classification Search ................ 208/47
See application file for complete search history.

(56) References Cited

U.S. PATENT DOCUMENTS

| | | | |
|---|---|---|---|
| 1,986,775 A * | 1/1935 | Kaufman et al. | 208/88 |
| 2,112,313 A | 3/1938 | Sowers | |
| 2,921,023 A | 1/1960 | Holm | |
| 4,634,519 A | 1/1987 | Danzik | |
| 5,182,013 A * | 1/1993 | Petersen et al. | 208/348 |
| 5,820,750 A * | 10/1998 | Blum et al. | 208/263 |
| 6,627,069 B2 | 9/2003 | Greaney | |

* cited by examiner

*Primary Examiner* — Prem C Singh
*Assistant Examiner* — Michelle Stein
(74) *Attorney, Agent, or Firm* — Fish & Associates, PC

(57) ABSTRACT

Naphthenic acid corrosivity of hydrocarbon feedstocks is correlated with the chemical composition of naphthenic acids, and especially with a ratio between an alpha fraction and a beta fraction of naphthenic acids. Contemplated plants, configurations, and methods are directed to reducing naphthenic acid corrosivity of hydrocarbon feedstocks by increasing the beta fraction over the alpha fraction.

8 Claims, 2 Drawing Sheets x-axis is a function dominated by molecular weight and structure, including factors such as reactive sulfur, velocity, phase, temperature, and pressure; y-axis is a measure of corrosivity and/or corrosion inhibition.

COMPOSITIONS, CONFIGURATIONS, AND METHODS OF REDUCING NAPHTENIC ACID CORROSIVITY

This application claims the benefit of U.S. provisional patent application with the Ser. No. 60/512,025, which was filed Oct. 17, 2003, and which is incorporated by reference herein.

FIELD OF THE INVENTION

Corrosion reduction in hydrocarbon refining, and especially as it relates to corrosion associated with naphthenic acid in hydrocarbon materials.

BACKGROUND OF THE INVENTION

Crude oils typically contain naphthenic acids to a varying degree, and the quantity of naphthenic acids predominantly depends on the particular formation from which they are obtained. For example, crude oils from California, Venezuela, North Sea, Western Africa, India, China, and Russia have often an undesirably high naphthenic acid content. Naphthenic acid and sulfur compounds in such crudes are often correlated with corrosion in crude and vacuum units and are generally thought to contribute to premature equipment failure of such units. Therefore, numerous approaches have been made to control or reduce naphthenic acid corrosion (NAC).

However, empirical data correlating naphthenic acid content and corrosivity are notoriously inconsistent due to several factors. Among other things, naphthenic acids encompass numerous chemically diverse species of carboxylic acids, and in most cases the qualitative and quantitative chemical composition, boiling point distribution, and decomposition temperature of naphthenic acid will directly influence corrosion rates in crude and vacuum units. For example, naphthenic acids typically include compounds of the general formula R—COOH where R comprises a substituted or unsubstituted alkyl, cycloalkyl, or aryl (each of which may have a varying degree of saturation). In most cases, naphthenic acids include as a common component compounds of the formula $R(CH_2)_n COOH$ in which R is a phenyl (or other unsaturated or partially saturated cycloalkyl or cycloaryl) ring and n is frequently between 1 and 12. Still further, naphthenic acids may additionally include non-carbon groups such as sulfur- or nitrogen-containing groups.

To complicate matters even further, there are numerous methods for quantification of naphthenic acids, most of which typically fail to provide consistent results. For example, the ASTM procedures for determination of Total Acid Number (TAN) are often sensitive to compounds commonly found in crudes (e.g., ASTM D974 or ASTM D664). Furthermore, these ASTM methods typically fail to differentiate between naphthenic acids, phenols, and other acids, organic and inorganic, present in the crude.

Other known procedures require removal of sulfurous compounds (sulfur tends to influence naphthenic acid corrosion) to provide analysis of the TAN number, such as UOP 565 (a potentiometric method), or UOP 587 (a colorimetric method). While such procedures typically provide at least some meaningful analysis of the sample under investigation, the influence of sulfur in the crude on the corrosivity can only be estimated as the sulfur is removed prior to analysis.

Evaluation of corrosivity is primarily by a classical model considering Total Acid Number (TAN), with TAN assigned based on milligrams of KOH required to neutralize a one gram sample of crude. If TAN is greater than 0.5 in feedstock or greater than 1.5 in side streams, a crude is commonly considered corrosive. Therefore, various refiners protect their plants by blending high naphthenic acid crudes with low acid crudes to a predetermined TAN number (e.g., below 0.5 for crudes or 1.5 for cuts), or by avoiding refining of crudes suspected of having relatively high quantities of naphthenic acids. Alternatively, the equipment may be constructed using corrosion resistant alloys (e.g., Mo-stainless steel), which substantially increases the cost, or corrosion inhibitors may be added, which has other disadvantages. Unfortunately, about 10-20% of the global crudes are now considered as having relatively high naphthenic acid content, and are therefore problematic to sell to refiners. Consequently, there is an unsatisfied need for improved compositions, configurations, and methods of reducing naphthenic acid corrosivity in hydrocarbon materials, and especially in crudes.

SUMMARY OF THE INVENTION

The present invention is directed to plants, compositions, and methods relating to reduction of naphthenic acid corrosivity of various hydrocarbon materials. In a further aspect of the invention, the inventors redefine the assessment of naphthenic acid corrosivity and the techniques to mitigate naphthenic acid corrosivity. More specifically, the inventors express naphthenic acid corrosivity as a function of the molecular weight and structure of the naphthenic acids, in which α naphthenic acids are generally characterized as corrosive, with low molecular weights, and in which β naphthenic acids are generally characterized as non-corrosive and inhibitive, with high molecular weights.

It is especially recognized that naphthenic acid corrosivity of hydrocarbon materials is substantially reduced where an alpha fraction of naphthenic acids is reduced, and/or where the ratio of beta to alpha fraction of naphthenic acids is increased. In one exemplary model, alpha fractions of naphthenic acids may be characterized has having a molecular weight of less than about 425, a relatively high water solubility, a relatively low pKa, a true boiling point of less than 725° F., and form highly oil-soluble iron-naphthenates, while beta fractions of naphthenic acids may be characterized has having a molecular weight of greater than about 400, a relatively low water solubility, a relatively high pKa, a true boiling point of greater than 725° F., and typically fail to form iron-naphthenates.

Therefore, in one preferred aspect of the inventive subject matter, a combination of a first refinery feedstock and a second refinery feedstock has a composition such that the fraction of the second refinery feedstock in the combination is at least in part a function of respective quantities of an alpha fraction and a beta fraction of total naphthenic acids in the first refinery feedstock. In such combinations, it is especially preferred that the fraction of the second refinery feedstock in the combination is effective to reduce naphthenic acid corrosivity of the first refinery feedstock, and/or that the first refinery feedstock comprises a refinery feedstock crude with a total acid number of at least 0.3, and wherein the second refinery feedstock comprises a refinery crude having a total acid number of at least 2.0, and more typically at least 2.5. While not limiting to the inventive subject matter, it is typically preferred that the second refinery feedstock is prepared from a refinery crude using a process that enriches that second refinery feedstock in beta naphthenic acids (e.g., using a solvent-based extraction method (e.g., water wash, solvent wash), vacuum treatment, or thermal hydroprocessing).

In another aspect of the inventive subject matter, the inventors further contemplate a combination of a refinery crude and a composition enriched in a beta fraction of naphthenic acids, wherein the amount of the composition in the combination is an amount effective to reduce naphthenic acid corrosivity of the refinery crude. Preferably, contemplated compositions are prepared from a hydrocarbon crude by a process that increases the relative amount of a beta naphthenic acid in the crude and/or reduces the relative amount of alpha naphthenic acid in the crude. Particularly preferred processes include solvent-based processes, vacuum treatment and/or hydroprocessing. Alternatively, or additionally, contemplated compositions include those that are considered non-corrosive despite having a TAN number between 0.5 and 3.0 (and even higher) and having naphthenic acids with a molecular weight of between about 325-900.

Thus, contemplated compositions also include mixtures of a first refinery feedstock and a second refinery feedstock, wherein the first feedstock is determined to have a specific quantity of alpha naphthenic acids, wherein the second feedstock is determined to have a specific quantity of beta naphthenic acids, and wherein the mixture has a composition such that corrosivity of the mixture is reduced as compared to corrosivity of the first feedstock.

In a further aspect of the inventive subject matter, a plant includes a first feedstock supply providing a first feedstock, and a second feedstock supply providing a second feedstock. A crude unit and/or a vacuum unit are configured to receive the first feedstock and the second feedstock, wherein the second feedstock is fed to the crude unit and/or vacuum unit in a predetermined amount that is effective to reduce naphthenic acid corrosion in the crude unit/vacuum unit as compared to naphthenic acid corrosion of the first feedstock without the second feedstock. It should be recognized that the first and second feedstocks are preferably combined before entering at least one of the crude unit and the vacuum unit.

Further contemplated plants include those in which a crude unit and/or a vacuum unit receive a feedstock, wherein the second feedstock is fed to the crude unit and/or vacuum unit in a predetermined amount that is effective to reduce naphthenic acid corrosion in the crude unit and/or vacuum unit as compared to naphthenic acid corrosion of the first feedstock without the second feedstock.

Additionally, contemplated plants may include a crude unit and/or vacuum unit that receive a feedstock, and a separation unit that removes beta naphthenic acids from the feedstock. A recycling circuit is further included in contemplated plants that provide at least some of the beta naphthenic acids back to the feedstock. Where desired, contemplated plants may further include one or more treatment units (e.g., water-wash unit, solvent wash unit, vacuum treatment unit, and/or hydrothermal treatment unit) that remove at least a portion of alpha naphthenic acids from the feedstock to form a treated feedstock having a predetermined alpha naphthenic acid to beta naphthenic acid ratio customized to suit the feedstock.

Consequently, in one aspect of the inventive subject matter, a method of operating a plant includes a step in which beta naphthenic acid content of a feed is determined, and in which the feed is combined with a hydrocarbon feedstock.

In especially preferred aspects, contemplated methods of operating a plant include a step in which naphthenic acid corrosivity of a first refinery feedstock is determined, and in which the content of a beta fraction of total naphthenic acids is determined in a second refinery feedstock. In another step, the first and second refinery feedstocks are combined to form a combined refinery feedstock having a combined naphthenic corrosivity, wherein the second refinery feedstock is combined with the first refinery feedstock in an amount such that the combined naphthenic corrosivity is less than the naphthenic corrosivity of the first refinery feedstock.

Alternatively, or additionally, a method of operating a plant may have a step in which a refinery feedstock comprising a beta fraction of total naphthenic acids is provided. In another step, the refinery feedstock is fractionated into at least one product fraction and a fraction comprising the beta fraction, and in yet another step, at least a portion of the fraction comprising the beta fraction is combined with the refinery feedstock.

Therefore, it should be appreciated that contemplated methods also include those in which thea total acid number and/or total content of naphthenic acids of a feedstock is determined. In another step of such methods, the total acid number and/or total content of naphthenic acids is increased (e.g., by adding beta naphthenic acids or a feed comprising beta naphthenic acids) to yield a modified feedstock with reduced naphthenic acid corrosivity as compared to the unmodified feedstock.

In a still further aspect of the inventive subject matter, a method of producing a hydrocarbon product includes one step in which a resource is identified as comprising a hydrocarbon feed, wherein that hydrocarbon feed was previously rejected for use as a feed to a crude unit and/or vacuum unit. In another step, the hydrocarbon feed is processed such that the ratio of beta naphthenic acids in the feed to alpha naphthenic acids in the feed increases.

In still further contemplated aspects of the inventive subject matter, a method of marketing includes a step of determining a quantity of a beta fraction of total naphthenic acids in a refinery feedstock, and another step of providing information correlating the quantity of the beta fraction with naphthenic acid corrosivity of the refinery feedstock.

Various objects, features, aspects and advantages of the present invention will become more apparent from the following detailed description of preferred embodiments of the invention.

DETAILED DESCRIPTION

Figure 1:
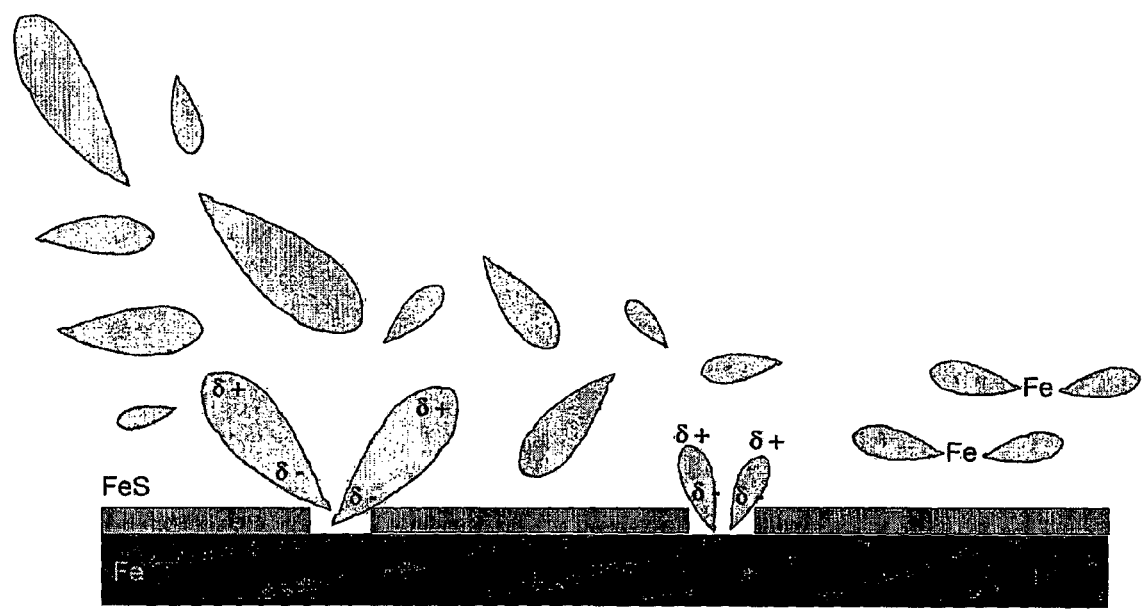
FIG. 1 schematically depicts an exemplary mode of reduction of naphthenic acid corrosivity by beta-fraction naphthenic acids according to the inventive subject matter.

The inventors have discovered that corrosivity in various hydrocarbon feedstocks, and especially in crudes, strongly correlates with the presence of a particular fraction of naphthenic acids. Specifically, the inventors discovered that presence of an alpha fraction of naphthenic acids in crudes correlates with increased corrosivity of such crudes, while presence of a beta fraction of naphthenic acids correlates with decreased corrosivity, and even inhibition of corrosivity of such crudes.

The term "naphthenic acids" as used herein refers to a class of compounds that have a structure of the general formula R—COOH (or R—COO$^-$ in deprotonated form, which may form a salt with a cation), wherein R comprises an optionally substituted alkyl, cycloalkyl, or aryl, (each of which may be partially or entirely desaturated) and wherein R is directly covalently bound to the optionally substituted alkyl, cycloalkyl, or aryl, or indirectly via the substituent. Typical substituents include alkyl, alkenyl groups, sulfur-containing groups (e.g., thioethers, thioesters, disulfides, SH groups, etc.), or nitrogen-containing groups (e.g., optionally substituted amino groups). Thus, a common representative of naphthenic acids includes compounds of the general formula R—$(CH_2)$n-COOH, in which R comprises a cycloalkyl, and in which n is an integer typically between 0-12.

The term "alpha fraction" or "α naphthenic acids" as used herein refers to a subset of naphthenic acids that have at least two of the following characteristics: (a) molecular weight in the range of 125 to 425; (b) true boiling point of less than 725° F.; (c) includes a carboxyl group that readily ionizes in aqueous solutions (i.e., pKa typically between 4-6.5); (d) neutralizes to form salts; (e) has solubility in water, with pH of 6 to 9, typically between 0.1-2.5 mg/liter; (f) forms iron naphthenate that is soluble in oil typically <0.1 mg/liter; and (g) does not form a protective film and thus promotes naphthenic acid corrosivity. Naphthenic acids belonging to the alpha fraction are therefore also termed "alpha naphthenic acids" herein. For example, benzoic acid or octanoic acid are considered alpha fraction naphthenic acids under the scope of the definition provided herein. It should be recognized that the term "alpha fraction" as used herein may refer to a single species of naphthenic acids as defined in this paragraph, but may also refer to a mixture of at least two distinct species of naphthenic acids as defined in this paragraph.

In contrast, the term "beta fraction" or "β naphthenic acids" as used herein refers to a subset of naphthenic acids that have at least two of the following characteristics: (a) molecular weight in the range of 325 to 900; (b) true boiling point of higher than 675° F. (and more typically between 725° F. and 1500° F.); (c) includes a carboxyl group that poorly ionizes in aqueous solutions with (pKa typically between 5.5 to 7.5) (d) has difficulty in forming salts; (e) has solubility in water, with pH of 6 to 9, typically between 0.0 to 0.3 mg/liter; (f) forms iron naphthenate that is soluble in oil typically >0.08 mg/liter; and (g) forms a protective and inhibitive surface film and thus reduces naphthenic acid corrosivity. Naphthenic acids belonging to the beta fraction are therefore, also termed "beta naphthenic acids" herein. It should further be recognized that the term "beta fraction" as used herein may refer to a single species of naphthenic acids as defined in this paragraph, but may also refer to a mixture of at least two distinct species of naphthenic acids as defined in this paragraph.

Figure 2:
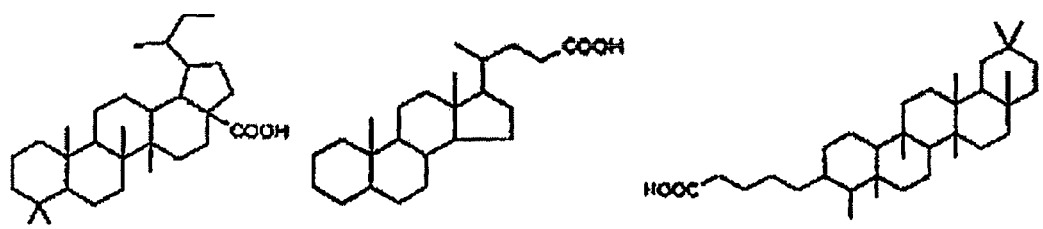
FIG. 2 depicts selected exemplary beta fraction naphthenic acids.

For example, a beta fraction of naphthenic acids will have one or more carboxylic acid groups covalently coupled to a group R that comprises a plurality of aromatic rings that are covalently coupled to each other (most typically annulated ring systems) and comprise 4 and more ring systems (e.g., asphaltenes). For example, structures shown in FIG. 2 depict typical beta fraction naphthenic acids. In further especially contemplated aspects, it is generally preferred that the group R comprises a sterically relatively large group (e.g., asphaltene, phenanthrene, anthracene, each of which may further be substituted), wherein the R group of one naphthenic acid molecule is sufficiently large to interfere with the R group of another naphthenic acid molecule in a manner such that formation of iron napthenate is reduced. Table 1 below lists typical properties of alpha and beta fractions of naphthenic acids:

| ALPHA FRACTION NAP ACIDS | BETA FRACTION NAP ACIDS |
|---|---|
| Low molecular weight ~125-425 | High molecular weight ~325-900 |
| Moderate to high solubility in aqueous solutions of pH 6-9; typically 0.1-2.5 mg/liter moderate to low solubility in oil, typically <0.1 | Low solubility in aqueous solutions of pH 6-9, typically 0 to 0.3 depending on molecular weight; high solubility in oil typically >0.08 |
| Carboxyl group readily ionizes in aqueous solutions with pKa typically between 4-6.5 | Carboxyl group poorly ionizes in aqueous solutions with pKa typically between 5.5 to 7.5 |
| Neutralizes to form salts | Difficult to neutralize |
| Iron naphthenate - highly soluble in oil | Iron naphthenate - difficult to form |
| True boiling point up to ~725° F. | True boiling point up to ~675°-1500° F.) |
| No protective surface film formation | Formation of protective and inhibitive surface film |
| Decompose at elevated temperatures above 650 F. | Fail to readily decompose at elevated temperatures above 650 F. |
| Follows classical naphthenic acid corrosivity model (i.e. TAN) | Does not follow classical naphthenic acid corrosivity model |

It should be appreciated that there are numerous methods known in the art that allow a person of ordinary skill in the art to ascertain the quantity of alpha and/or beta naphthenic acids, and all of such methods are considered appropriate for use herein. For example, suitable methods include fractionated distillation, numerous chromatographic separations (e.g., adsorption, reverse phase, ion exchange, etc.), solvent extractions, all of which may be coupled with various analytical methods well known in the art. Exemplary analytical methods include mass spectroscopy, nuclear magnetic resonance spectroscopy, UV/VIS spectroscopy, IR/Raman spectroscopy, titration, etc.

As further used herein, the terms "naphthenic acid corrosion" (NAC) and "naphthenic acid corrosivity" refer to metal loss on a metal surface exposed to the naphthenic acid (observed primarily in refinery crude and vacuum units), which typically manifests itself as grooving in carbon steel, low alloy steel, and stainless steels containing below 2.5% Mo without any deposition of scale or corrosion products. As still further used herein, the term "refinery feedstock" refers to all hydrocarbon-containing fluids that are fed to a process unit. Therefore, refinery feedstocks include crudes (which may or may not be at least partially refined) and processed hydrocarbon fluids (e.g., fraction of a crude distillate).

Naphthenic acid attack is commonly reported in crude units and vacuum units when operating between the temperatures of 450° F. and 750° F., with maximum damage occurring between 550° F. and 650° F. where naphthenic acids condense. However, it is commonly observed that laboratory-determined TAN (total acid number as determined by neutralization) levels measuring corrosivity of crudes may not always correlate with industrial corrosivity experience in crude units and vacuum units.

Figure 3:
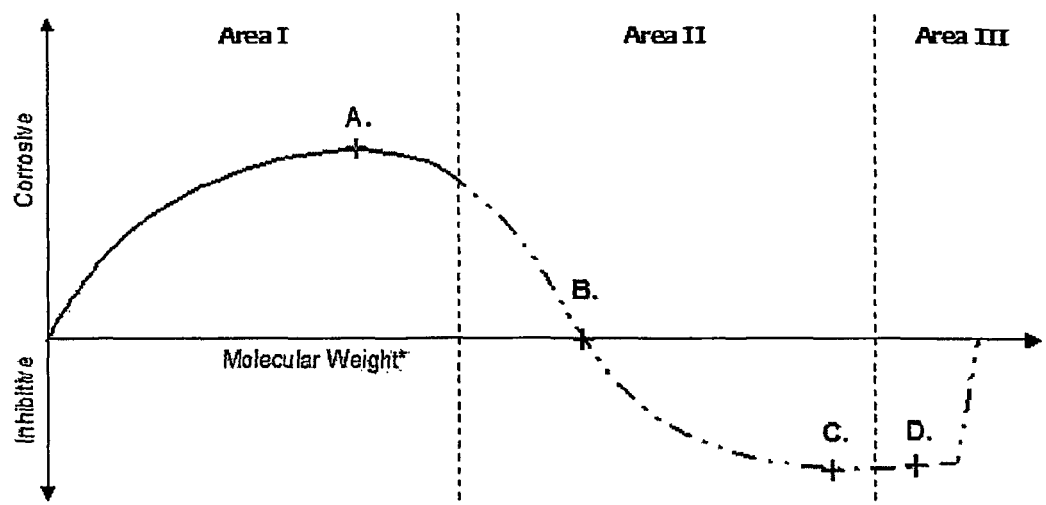
FIG. 3 is a schematic graph depicting corrosivity and corrosion inhibition as a function of molecular weight and structure, including factors such as reactive sulfur, velocity, phase, temperature, and pressure.

Based on various observations, the inventors now propose a new model of NAC in which corrosivity is correlated to the presence of the alpha and beta fraction in the crude. FIG. 3 depicts a graphical representation in which the x-axis is a function dominated by molecular weight and structure, including factors such as reactive sulfur, velocity, phase, temperature, and pressure, and in which the y-axis is a measure of corrosivity and/or corrosion inhibition.

In Area I, NAC increases with increasing size and molecular weight of the naphthenic acids. Point A is the hypothetical point where maximum corrosivity is achieved for a given system and conditions. Area II reflects the inventors' contemplated beneficial effects of beta naphthenic acids which has been experimentally confirmed by blending crudes having high content of beta naphthenic acids with corrosive crudes to produce a low/non-corrosive blend. For example, Athabasca bitumen crudes appear to fall within an area at or near point B as such crudes have significant levels of naphthenic acid (as indicated by high TAN number), however, fail to exhibit any significant associated NAC. Preliminary tests blending high TAN opportunity crudes with Athabasca crudes at a ratio of 9:1 have produced a mixture with substantially reduced corrosivity.

The inventors further contemplate that the most inhibitive, β naphthenic acid fractions (corresponding to naphthenic acids at or near point C) can be concentrated and used to inhibit NAC in opportunity crudes. Area III is the region that holds less technical or commercial value with point D lying beyond the optimum NAC inhibition level.

The inventors further recognized that Athabasca bitumen crudes, characterized as corrosive by the classical naphthenic model, are producing negligible corrosion in crude units and vacuum units. Indeed, reports from facilities processing Athabasca bitumen crudes with TAN levels of 3-4 and 2-3% total sulfur and approximately 1 wt % reactive sulfur have found little or no evidence of naphthenic acid corrosion (most corrosive damage has been attributed to sulfidation corrosion in these plants) in crude and vacuum units of carbon steels, low alloys, 12Cr, and stainless steels. Remarkably, blending of high TAN opportunity crudes with Athabasca crudes at a ratio of 9:1 have produced a mixture with substantially reduced corrosivity (in most of the tested cases, corrosivity was identical with that of Athabasca crudes). Further investigation revealed that the opportunity crudes were characterized as corrosive containing low molecular weight naphthenic acids, while the Athabasca crudes were characterized as non-corrosive containing high molecular weight naphthenic acids.

In one exemplary series of analyses, naphthenic acids of opportunity crudes were characterized as having relatively low molecular weight (between about 125-425). Such naphthenic acids are further expected to exhibit moderate to high solubility in water, and moderate to low solubility in oil, which may at least in part attributed to the relatively rapid ionization of the carboxyl group in aqueous solutions. A further typical characteristic of such opportunity crudes was their ability to neutralizes to form salts. Not surprisingly, such opportunity crudes readily formed iron naphthenates with high solubility in oil. The true boiling point was observed as being up to 725° F. Furthermore, such naphthenic acids provided no protective film formation, and the naphthenic acids corrosivity followed the classic corrosivity model in which the total acid number correlates with the naphthenic acids corrosivity.

In contrast, in another exemplary series of analyses, naphthenic acids of Athabasca crudes were characterized as having relatively high molecular weight (typically in the range of about 325-900), and had a low solubility in water and a high solubility in oil. Still further, the carboxyl group of such naphthenic acids is further expected to poorly ionize in aqueous solutions, and is therefore difficult to neutralize. Not surprisingly, these naphthenic acids almost completely failed to form the corresponding iron naphthenates. The true boiling point of such naphthenic acids was typically in the range of about 675° F.-1500° F., which in most cases is above the average crude true boiling point. These naphthenic acids generally allowed formation of protective and inhibitive films, and did not follow the classic corrosivity model.

Based on these observations and other data (see section entitled "Examples"), the inventors contemplate a model in which corrosivity of hydrocarbon feedstocks that include naphthenic acids can be predicted by, or adjusted using the presence (and/or ratio) of alpha fractions of naphthenic crudes and beta naphthenic crudes. With contemplated methods and configurations, less attention is focused on laboratory testing for TAN and more effort is put into naphthenic acid molecular weight distribution profiling, structure evaluation, and on-line corrosion monitoring. Thus, it should be appreciated that a distribution profile taken into account the above characteristics is thought to be more informative than a TAN number-based assessment.

Using naphthenic acid profiling in evaluation of naphthenic acid corrosivity, the inventors therefore contemplate that refinery feedstocks may be combined to reduce naphthenic acid corrosivity, wherein the relative amounts of first and second feedstocks will be a function of their respective naphthenic acid profiles. For example, it is generally contemplated that corrosivity of a previously deemed corrosive feedstock (e.g., opportunity crudes having an alpha fraction and a beta fraction of total naphthenic acids previously deemed unfavorable, or having a total acid number of at least 0.3) may be reduced by combining that feedstock with a second feedstock previously determined to have a specific quantity of a beta fraction of naphthenic acids (e.g., having a total acid number of at least 2.5). The quantity of the added second feedstock will then be determined at least in part by the quantity of the beta fraction of naphthenic acids in the second feedstock. Thus, a combination of a first refinery feedstock and a second refinery feedstock may be obtained, wherein the fraction of the second refinery feedstock in the combination is at least in part a function of respective quantities of an alpha fraction and a beta fraction of total naphthenic acids in the first refinery feedstock. Typically, the amount of the second refinery feedstock that is added to the combination is effective to reduce naphthenic acid corrosivity of the first refinery feedstock. Viewed from another perspective, the inventors therefore contemplate a mixture of a first refinery feedstock and a second refinery feedstock, wherein the first feedstock is determined to have a specific quantity of alpha naphthenic acids, wherein the second feedstock is determined to have a specific quantity of beta naphthenic acids, and wherein the mixture has a composition such that corrosivity of the mixture is reduced as compared to corrosivity of the first feedstock.

Alternatively, where a second feedstock with a desirable naphthenic acid profile is not available or economically unattractive, it should also be recognized that combinations may be prepared in which a first feedstock (e.g., previously determined corrosive) is blended with a composition that is enriched in a beta fraction of naphthenic acids. In such combinations, it should be recognized that the amount of the composition added is an amount that is effective to reduce naphthenic acid corrosivity of the first feedstock. Particularly preferred compositions include those derived from crude that is known to have low or even no naphthenic acid corrosivity.

On the other hand, it should also be appreciated that the composition may at least in part synthetic, to achieve a predetermined physico-chemical characteristic. For example, synthetic compositions may be mixtures of naphthenic acids with a molecular weight of at least 500 and low water solubility.

Beta fraction naphthenic acids and/or hydrocarbon materials comprising (or enriched in) beta fraction naphthenic acids may be obtained in numerous manners, and all known manners are contemplated suitable for use herein. For example, the chemical structure of particularly desirable beta fraction naphthenic acids may be determined (e.g., via fractionated isolation followed by spectroscopic identification [e.g., NMR, IR and/or mass spectroscopy, spectroscopy, etc.]), and such naphthenic acids may then be synthetically prepared. On the other hand, where crudes are available having relatively high beta fraction naphthenic acid content, the desirable naphthenic acids may be isolated or enriched using distillation as many of the desirable naphthenic acids have a true boiling point that is higher than the true boiling point of the crude.

In yet further contemplated methods, a crude or other hydrocarbon fraction may be enriched in the beta fraction by preferentially removing at least part of the alpha fraction. Especially suitable methods of preferentially removing the alpha fraction include thermal hydroprocessing in which the hydrocarbon material is subjected, for example, to a hot extraction wash or a (in-situ) steam injection. There are numerous extraction methods known in the art, and all of them are deemed suitable for use herein. In such approaches (which may be performed in a separate alloyed reactor), the beta naphthenic acid concentration and/or beta to alpha ratio may be increased by raising the temperature above the boiling point of the alpha fraction and removing at least a portion of the alpha fraction.

Depending on the source of the composition, it should be recognized that the naphthenic acid molecular weights distribution may vary considerably. Therefore, contemplated molecular weights for blending a β profile of crude may be in the range of ~325-900. However, the total acid number of contemplated compositions, following the classical model TAN guidelines (TAN) may be over 0.5 TAN in feed stock and over 1.5 TAN is side cut streams, which is considered corrosive.

It should further be appreciated that the exact relative quantities of alpha fraction to beta fraction in contemplated mixtures may vary and will typically depend (among other factors) on the specific chemical composition and quantities of particular naphthenic acids present in the alpha fraction. Therefore, contemplated ratios of alpha fraction to beta fraction are typically 99:1 (or less), and more typically 9:1 (or less). However, and as elaborated in the following, an alpha to beta ratio may not be as important as the absolute quantity of beta-type naphthenic acids. While not wishing to be bound by any theory or hypothesis, the inventors contemplate that at least some of the beta fraction naphthenic acids may be inhibitive to naphthenic acid corrosion, and be active in sub-stoichiometric quantities (relative to alpha fraction naphthenic acids).

Thus, in one contemplated mode of action, the inventors consider a mechanism as schematically depicted in FIG. 1. Here, alpha fraction naphthenic acids (small tear shaped molecules) are sufficiently small and chemically reactive to dissolve an iron ion from the surface of vessel and/or pipe to thereby form an iron naphthenates, which is known to be corrosive. On the other hand, the relatively large, sterically hindered (and chemically less reactive) beta fraction naphthenic acids (large tear shaped molecules) will bind to the iron in the surface of vessel and/or pipe to thereby form a naphthenic acid containing passivation layer. Among other things, it is contemplated that the beta fraction naphthenic acids may be sterically hindered in a manner such as to reduce or even completely eliminate iron naphthenates formation. Alternatively, or additionally, uneven charge distribution may also contribute to the lack of iron naphthenate formation. Regardless of the particular nature of the iron-beta fraction naphthenates interaction, it is contemplated that the beta fraction may form an iron naphthenates passivation layer.

Consequently, the inventors contemplate a method of reducing naphthenic acid corrosivity of a feedstock in a plant in which an iron-binding molecule is added to the feedstock, wherein the iron-binding molecule binds to iron disposed in a metal surface that contacts the feedstock, and wherein the iron-binding molecule does substantially not dissolve (i.e., no more than 5%) the iron into the feedstock. There are numerous iron-binding molecules known in the art, and a person of ordinary skill in the art should readily determine if a specific iron-binding molecule may be suitable for use as corrosion reducing agent. Thus, iron-binding molecules need not be limited to naphthenates, but may also include deferoxamine and modified forms thereof, hydrophobic poly carboxylic acids, etc.

Based on the inventors discoveries and contemplated mixtures, particularly preferred plants may therefore include a first feedstock supply (e.g., from a tank, pipeline, or oilfield) that provides a first feedstock, and a second feedstock supply (e.g., from a tank, pipeline, or oilfield) that provides a second feedstock. A crude unit and/or a vacuum unit receives the first feedstock and the second feedstock (separately, or as a mixture), wherein the second feedstock is fed to the crude and/or vacuum unit in a predetermined amount that is effective to reduce naphthenic acid corrosion in the crude unit and/or vacuum unit as compared to naphthenic acid corrosion of the first feedstock without the second feedstock.

Alternatively, it should also be appreciated that suitable plants may include a recycle loop in which a beta fraction of a feedstock is circulated to maintain a reduced naphthenic acid corrosivity. In such plants, a crude unit and/or a vacuum unit receive a feedstock, and a separation unit (which may be the crude unit, the vacuum unit, or an additional unit) removes a beta fraction of naphthenic acids from the feedstock. A recycling circuit will then provide at least some of the beta naphthenic acids to the feedstock. Thus, it should be appreciated that in such plants the beta-fraction need not be continuously added to a feedstock that is deemed corrosive as the corrosion inhibiting naphthenic acid circulates within the plant. Addition of the beta fraction of naphthenic acids to such plants may be in the form of a hydrocarbon feedstock that includes a relatively large amount of beta fraction naphthenic acids, or via a composition comprising (or enriched in) a beta fraction of naphthenic acids. It should further be appreciated that the beta naphthenic acids are provided to the feedstock via the recycling circuit in an amount effective to reduce naphthenic acid corrosivity of the feedstock. With respect to suitable amount, the same considerations as discussed above for the ratio of beta to alpha naphthenic acids apply.

Alternatively, contemplated plants may also include a unit in which an alpha fraction of naphthenic acids is at least partially removed from a feedstock to thereby produce a less corrosive treated feedstock. Typically, contemplated plants will include a crude unit and/or a vacuum unit that receive a treated feedstock having a predetermined alpha naphthenic acid to beta naphthenic acid ratio, wherein the treated feedstock is produced by a hydrothermal treatment unit (e.g., a hot extraction wash unit) that receives a feedstock and removes at least a portion of alpha naphthenic acids from the feedstock. With respect to the predetermined ratio of beta naphthenic acid to alpha naphthenic acid, the same considerations as provided above apply.

Consequently, the inventors contemplate a method of operating a plant in which the beta naphthenic acid content of a feed is determined, and in which the feed is combined with a hydrocarbon feedstock. Such methods are particularly advantageous where a hydrocarbon feedstock comprises appreciable quantities of beta fraction naphthenic acids, which can be employed to reduce naphthenic acid corrosivity in another hydrocarbonaceous feedstock. In yet further contemplated aspects of the inventive subject matter, a plant may be operated such that the naphthenic acid corrosivity of a first refinery feedstock is determined. The content of a beta fraction of total naphthenic acids in a second refinery feedstock (e.g., Athabasca oilsand crudes) is then determined, and the first and second refinery feedstock are combined to form a combined refinery feedstock having a combined naphthenic corrosivity which is less than the naphthenic corrosivity of the first refinery feedstock.

In most of such plant operations, the first feedstock corrosivity may be determined using all manners known in the art, which will typically include empiric determination of corrosivity where the source and composition of the first feedstock will not change substantially. Alternatively, the corrosivity may also be determined by chemical analysis of the total naphthenic acid (e.g., via determination of the TAN number), or most preferably by determination of the alpha fraction of naphthenic acids in the first feedstock. Similarly, all known methods of determination of the beta fraction of total naphthenic acids in the second refinery feedstock are considered suitable for use herein.

Where contemplated plants include a separation unit in which the beta fraction of the naphthenic acids may be removed, a method of operating a plant is contemplated in which in one step a refinery feedstock is provided that comprises a beta fraction of total naphthenic acids. In an other step, the refinery feedstock is fractionated into at least one product fraction and a fraction comprising the beta fraction, and in yet another step, at least a portion of the fraction comprising the beta fraction is combined with the refinery feedstock (e.g., via a recycle loop). The fraction comprising the beta fraction may be combined with the refinery feedstock in numerous manners, however, it is generally preferred that the feedstock is fed into at least one of a crude unit and a vacuum unit after the step of combining and before the step of fractionating.

Thus, it should be appreciated that in some aspects of the inventive subject matter the total content of naphthenic acids is reduced (via reduction of the alpha fraction), in other aspects of the present invention, the total acid number may actually increase while the corrosivity of the feedstock having the increased TAN number decreases. Consequently, a method of operating a plant may include a step in which the total acid number of a feedstock is determined. In another step, the total acid number of that feedstock is increased to reduce naphthenic acid corrosivity of the feedstock. It should be appreciated that the total acid number of that feedstock may be increased in numerous manners, and especially preferred manners include adding a composition comprising or enriched in beta naphthenic acids, and/or adding a synthetic or isolated quantity of naphthenic acids having an average molecular weight of at least 350.

Thus, it should be appreciated that by using the inventive concept presented herein, hydrocarbon resources that were previously rejected for use as a feed to a crude unit and/or a vacuum unit can now be treated to provide a useful hydrocarbon product. For example, a method of producing a hydrocarbon product may include a step in which a resource is identified as comprising a hydrocarbon feed that was previously rejected for use as a feed to a crude unit and/or a vacuum unit. In a further step, the hydrocarbon feed is then processed such that the ratio of beta naphthenic acids in the feed to alpha naphthenic acids in the feed increases. As discussed above, an increase in the ratio of beta naphthenic acids to alpha naphthenic acids is contemplated to be inhibitory to naphthenic acid corrosion. Typical examples of such previously rejected resources include oilfields that yield a hydrocarbon with relatively high alpha naphthenic acid composition (typically manifested in relatively high naphthenic acid corrosivity). Particularly preferred methods of processing the hydrocarbon feed will include hydrothermal processing, distillation to remove or destroy alpha naphthenic acids, and/or addition of beta naphthenic acids.

In view of the foregoing, it should be appreciated that knowledge of the content of the alpha and beta naphthenic acids will at least potentially provide significant value in marketing of a hydrocarbon product. Consequently, it is contemplated that a method of marketing will include one step in which the quantity of a beta (and optionally alpha) fraction of total naphthenic acids in a refinery feedstock is determined. In another step, information is provided in which the quantity of the beta (and optionally alpha) fraction is correlated with naphthenic acid corrosivity of the refinery feedstock. Of course it should be recognized that the step of providing information may be performed in numerous manners, including written, information, graphic information, and electronically displayed information. Furthermore, the information may be provided by the entity selling the hydrocarbon product, or by another source of information (e.g., in form of a table, computer algorithm, etc.).

Thus, specific embodiments and applications of compositions, configurations, and methods of reducing naphthenic acid corrosivity have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. A method of operating a plant, comprising:
    determining naphthenic acid corrosivity of a first refinery feedstock, and determining content of a beta fraction of total naphthenic acids in a second refinery feedstock;
    wherein the step of determining naphthenic acid corrosivity of the first refinery feedstock comprises determination of an alpha fraction of naphthenic acids, wherein the naphthenic acids in the alpha fraction are characterized by at least two of (a) a molecular weight of between 125 to 425, (b) a true boiling point of less than 725° F., (c) a solubility in water at a pH of 6 to 9 between 0.1-2.5 mg/liter, and (d) a solubility of iron naphthenates in oil formed from the naphthenic acids of <0.1 mg/liter;

wherein the naphthenic acids in the beta fraction are characterized by at least two of (a) a molecular weight of between 325 to 900, (b) a true boiling point of between 725° F. and 1500° F., (c) a solubility in water at a pH of 6 to 9 between 0.0-0.3 mg/liter, and (d) a solubility of iron naphthenates in oil formed from the naphthenic acids of >0.08 mg/liter;

combining the first and second refinery feedstock to form a combined refinery feedstock having a combined naphthenic corrosivity; and wherein the amount of the second refinery feedstock in the combined refinery feedstock is a function of the beta fraction of total naphthenic acids in the second refinery feedstock such that the combined naphthenic corrosivity is less than the naphthenic corrosivity of the first refinery feedstock.

2. The method of claim 1 wherein the second refinery feedstock comprises Athabasca oil sand crudes.

3. A method of operating a plant, comprising a step of determining a total acid number of a feedstock, and a step of increasing the total acid number using a beta fraction of naphthenic acids in an amount effective to reduce naphthenic acid corrosivity of the feedstock.

4. The method of claim 3 wherein the step of increasing the total acid number comprises combining a hydrocarbon composition enriched in the beta fraction of naphthenic acids with the feedstock.

5. The method of claim 3 wherein the step of increasing the total acid number comprises combining naphthenic acids having an average molecular weight of at least 350 with the feedstock.

6. A method of producing a hydrocarbon product, comprising:
identifying a resource as comprising a hydrocarbon feed, wherein the hydrocarbon feed was previously rejected for use as a feed to at least one of a crude unit and a vacuum unit due to naphthenic acid corrosivity;
determining a ratio of beta naphthenic acids to alpha naphthenic acids in the feed; and
processing the hydrocarbon feed such that the ratio of beta naphthenic acids in the feed to alpha naphthenic acids in the feed increases.

7. The method of claim 6 wherein the step of processing comprises hydrothermal processing.

8. The method of claim 6 wherein the resource comprises opportunity crudes.

* * * * *